United States Patent [19]

Heronemus

[11] Patent Number: 4,497,363
[45] Date of Patent: Feb. 5, 1985

[54] PLATE-PIN PANEL HEAT EXCHANGER AND PANEL COMPONENTS THEREFOR

[76] Inventor: William E. Heronemus, 730 West St., Amherst, Mass. 01002

[21] Appl. No.: 372,539

[22] Filed: Apr. 28, 1982

[51] Int. Cl.³ .............................................. F28G 15/02
[52] U.S. Cl. ...................................................... 165/95
[58] Field of Search ......................................... 165/95

[56] References Cited

U.S. PATENT DOCUMENTS

| | | | |
|---|---|---|---|
| 2,009,863 | 7/1935 | Trane | 29/157.4 |
| 2,033,402 | 3/1936 | Smith | 165/95 |
| 2,184,658 | 12/1939 | Young | 165/79 |
| 2,190,494 | 2/1940 | Templin | 29/157.3 |
| 2,212,912 | 8/1940 | Booth | 62/126 |
| 2,303,416 | 12/1942 | Woods | 18/59 |
| 2,385,542 | 9/1945 | Rippingille | 29/157.3 |
| 2,415,243 | 2/1947 | Hickman | 62/8 |
| 3,239,000 | 3/1966 | Meagher | 165/46 |
| 3,265,126 | 8/1966 | Donaldson | 165/140 |
| 3,416,600 | 12/1968 | Fink | 165/175 |
| 3,434,532 | 3/1969 | Henriksson | 165/95 |
| 3,486,489 | 12/1969 | Huggins | 123/41.33 |
| 3,633,660 | 1/1972 | Young | 165/69 |
| 3,662,582 | 5/1972 | French | 72/367 |
| 3,668,757 | 6/1972 | Rieder | 29/157.3 R |
| 3,920,069 | 11/1975 | Mosier | 165/150 |
| 3,993,126 | 11/1976 | Taylor | 165/173 |
| 4,043,015 | 8/1977 | Hickman et al. | 29/157.4 |
| 4,055,145 | 10/1977 | Mager et al. | 119/2 |
| 4,119,140 | 10/1978 | Cates | 165/115 |
| 4,371,032 | 2/1983 | Buttner | 165/94 X |

FOREIGN PATENT DOCUMENTS 2345721 3/1975 Fed. Rep. of Germany ........ 165/95
594599 9/1925 France ................................. 165/95

OTHER PUBLICATIONS

C. B. Panchal et al., OTEC Performance Tests of the Trane Plate-Fin Heat Exchanger, Argonne National Laboratory ANL/OTEC-PS-7.
A. G. Butt, Mechanical Design of Cryogenics Heat Exchangers, HTD vol. 10, Nov. 1980.

Primary Examiner—Sheldon J. Richter
Attorney, Agent, or Firm—Kenyon & Kenyon

[57] ABSTRACT

A plate-fin panel for a heat exchanger may be either formed as an aluminum extrusion or fabricated from a corrugated metal sheet sandwiched between two flat metal sheets. The extruded aluminum version may be clad with protective sheet metal jackets made of, or coated with, a corrosion resistant Cu-Ni alloy. Individual panel sections can be joined together by tongue and groove engagement to obtain a total desired panel width if available extrusion press or rolling mill capacity is insufficient. The plate-fin panels are assembled into slotted headering plates, and a layer of synthetic plastics potting compound seals dissimilar metal joints against electrolytic corrosion as well as leakage and provides sufficient adhesive strength to reduce or eliminate the need for welding the panels to the headers. Mechanical brush or hydraulic jet apparatus is capable of continuously or intermittently cleaning slime or encrustations from all panel surfaces exposed to seawater.

34 Claims, 30 Drawing Figures

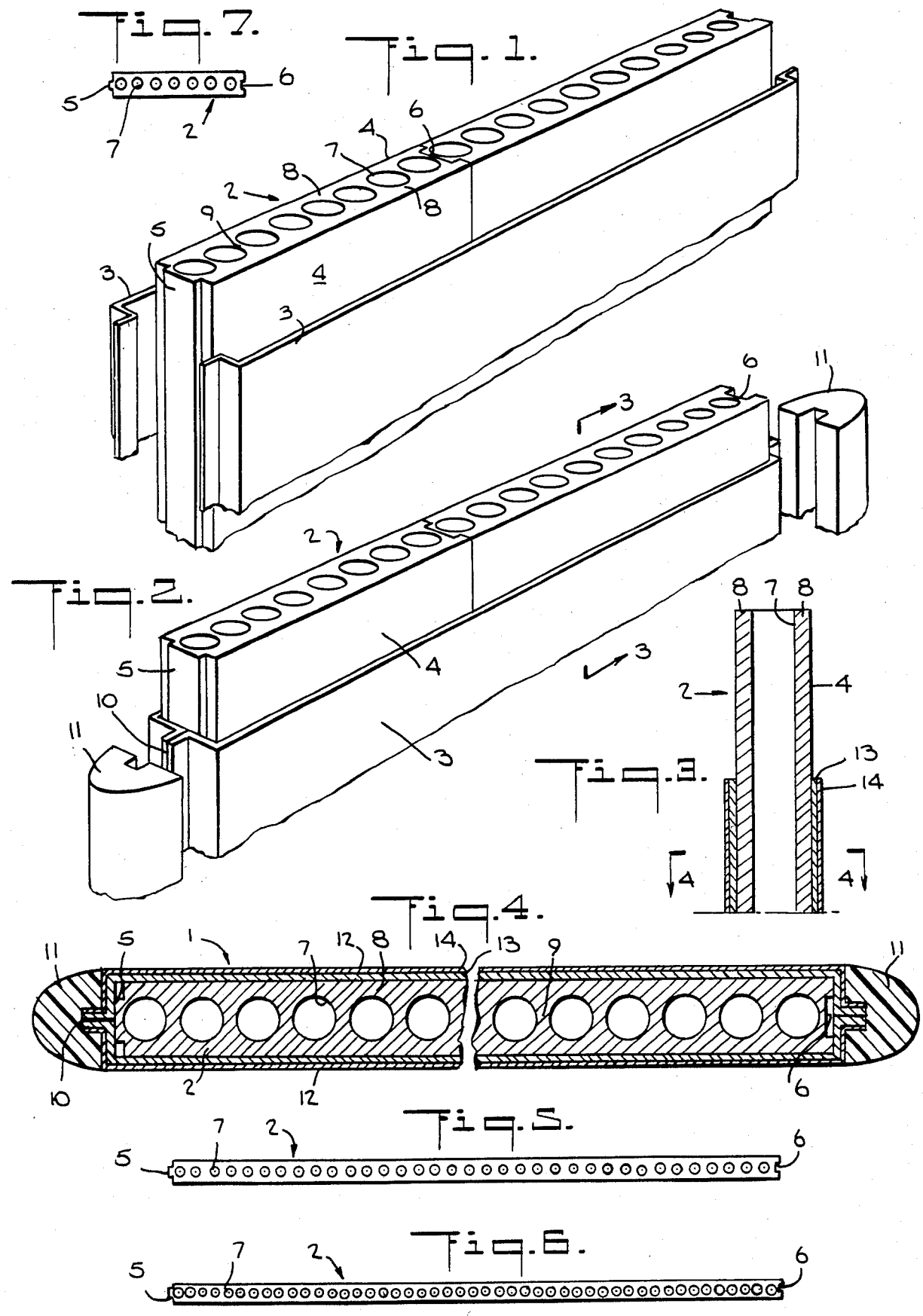

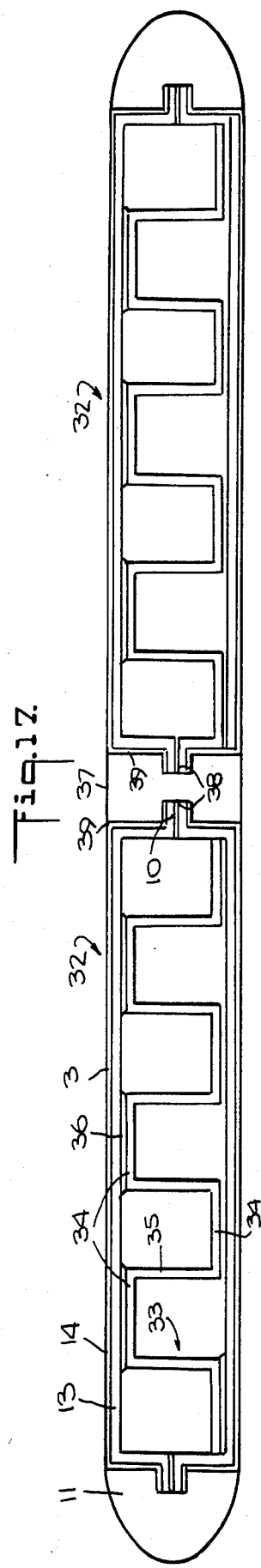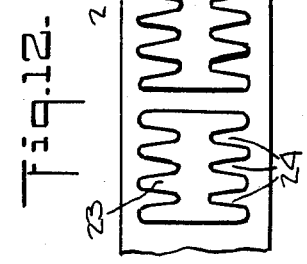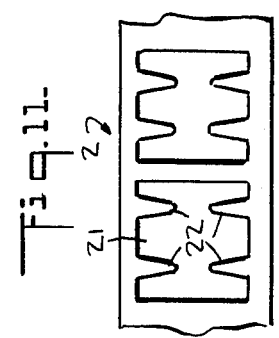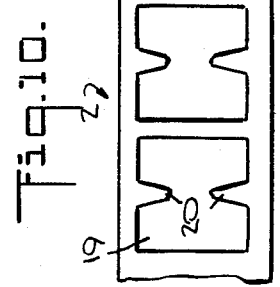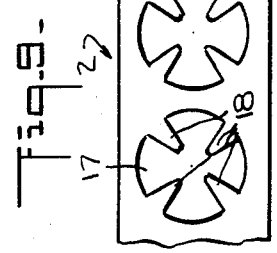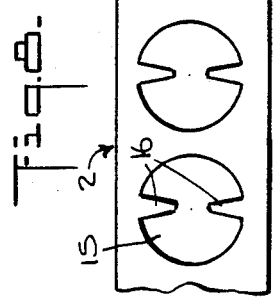

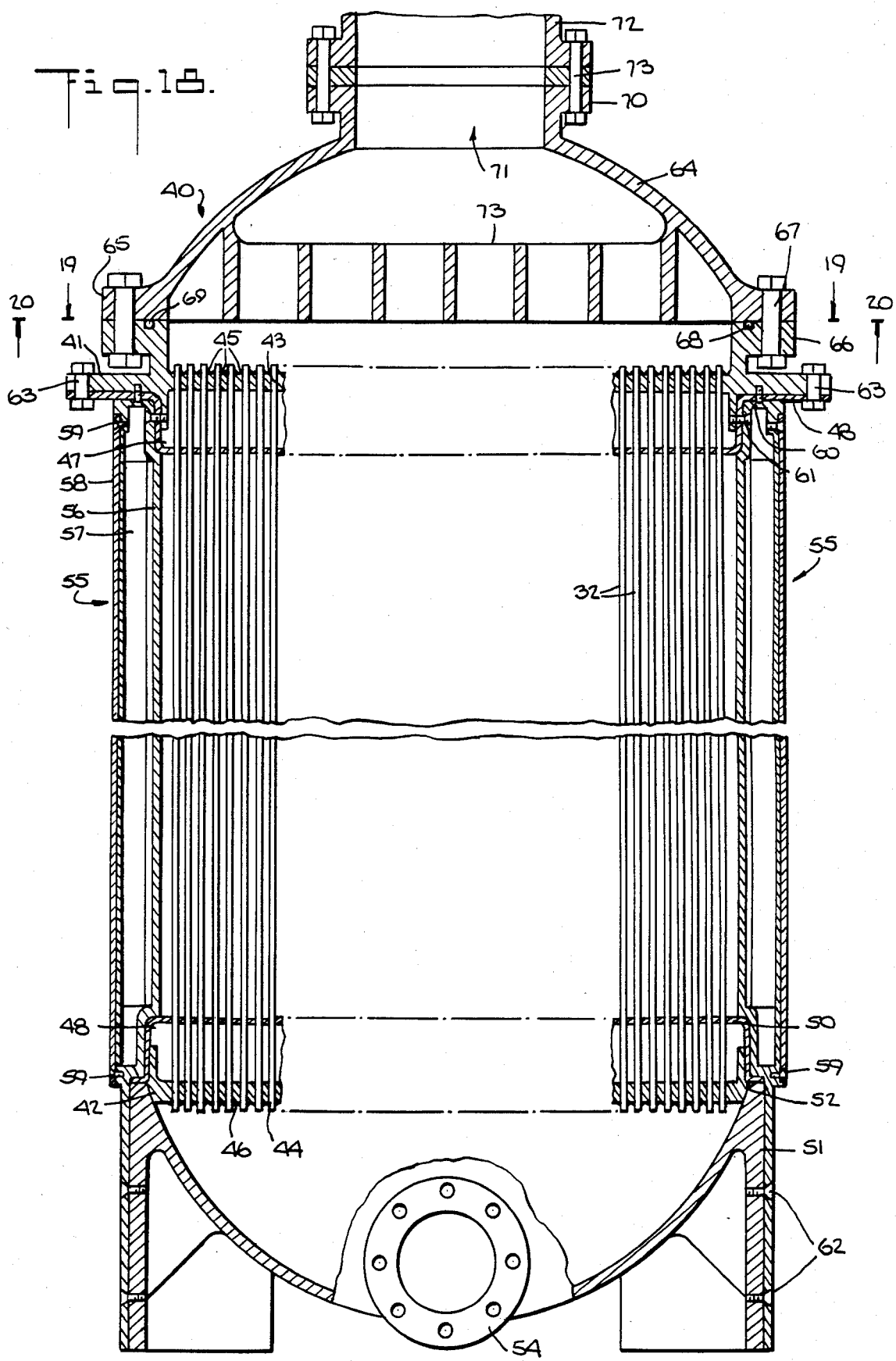

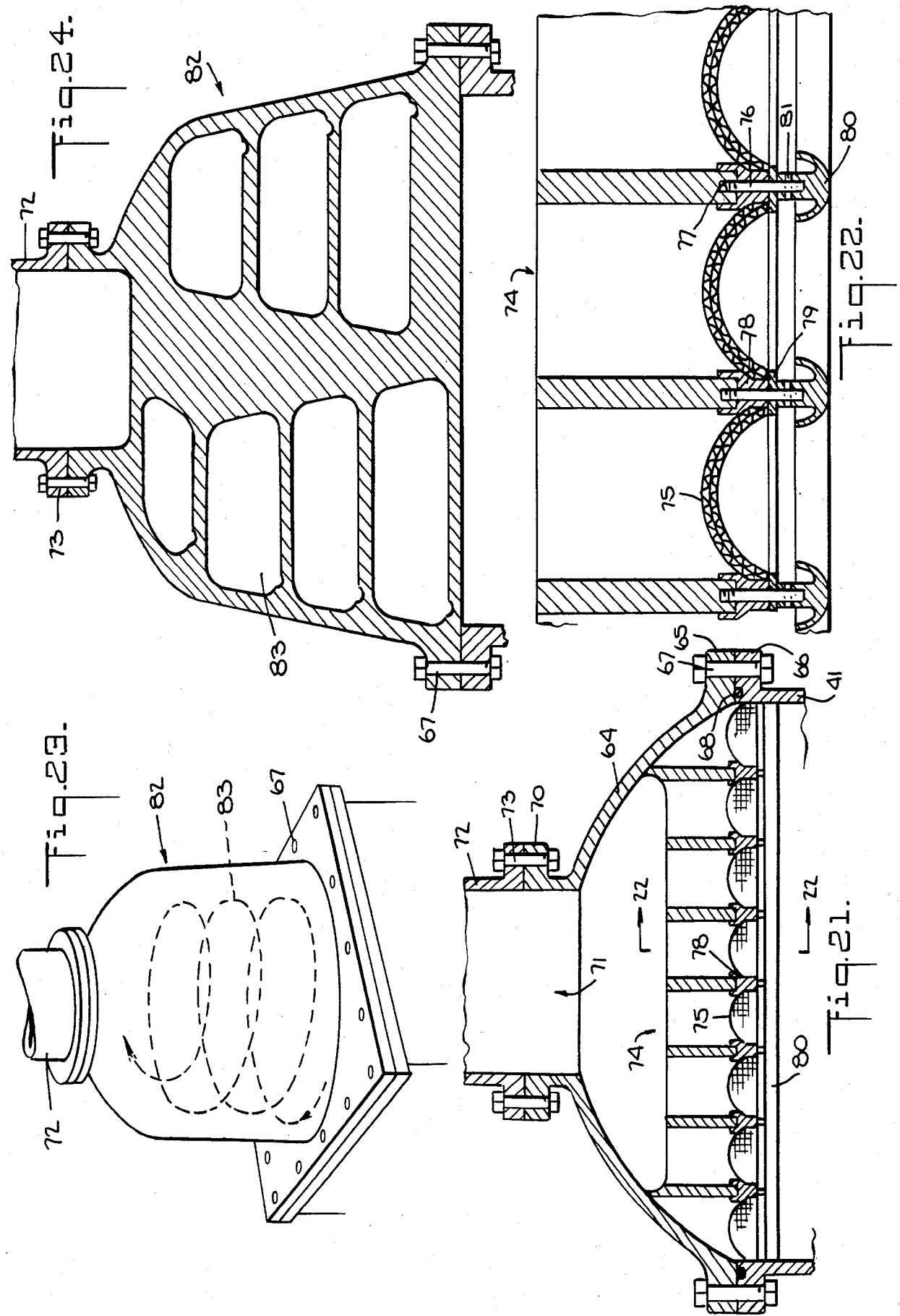

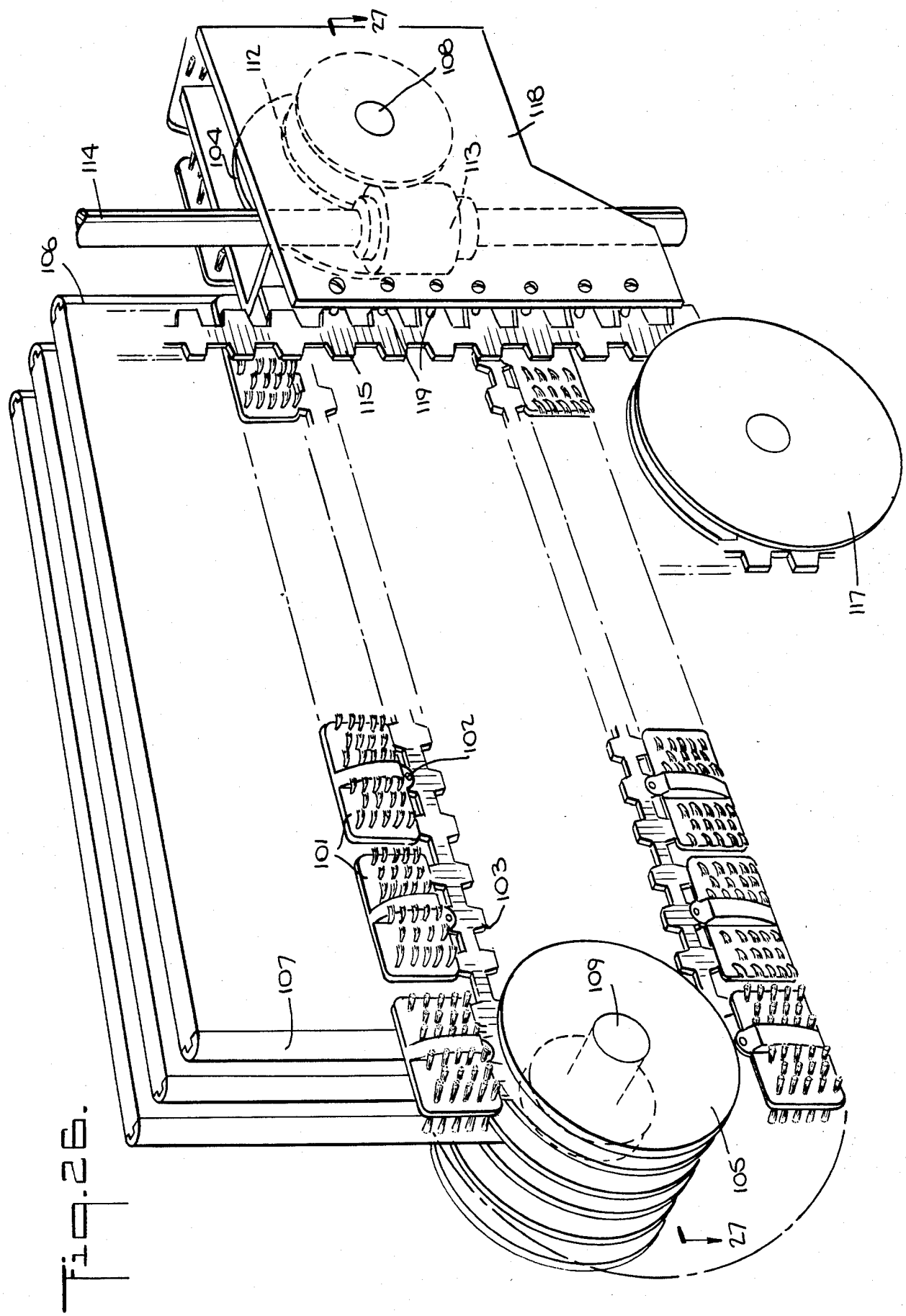

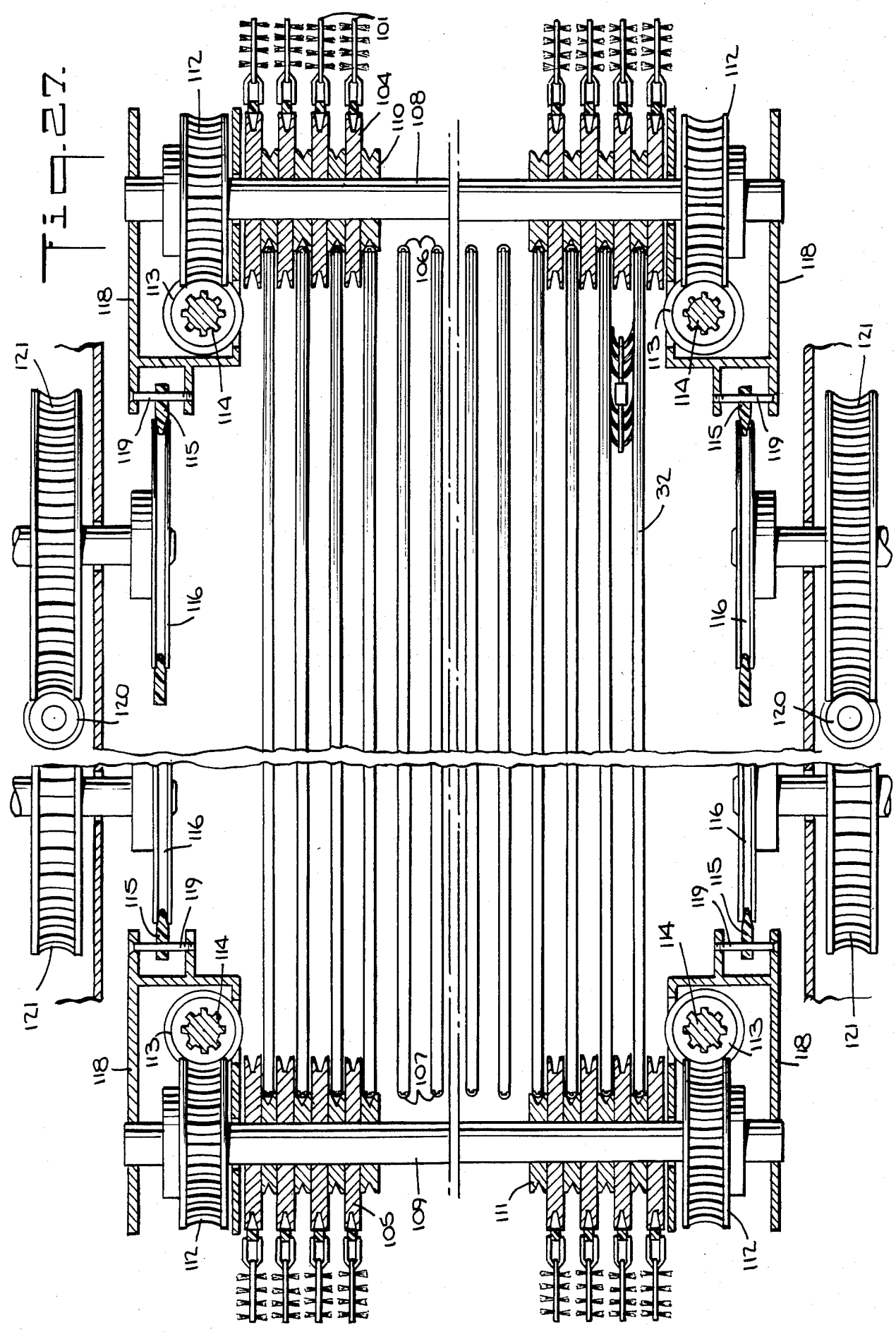

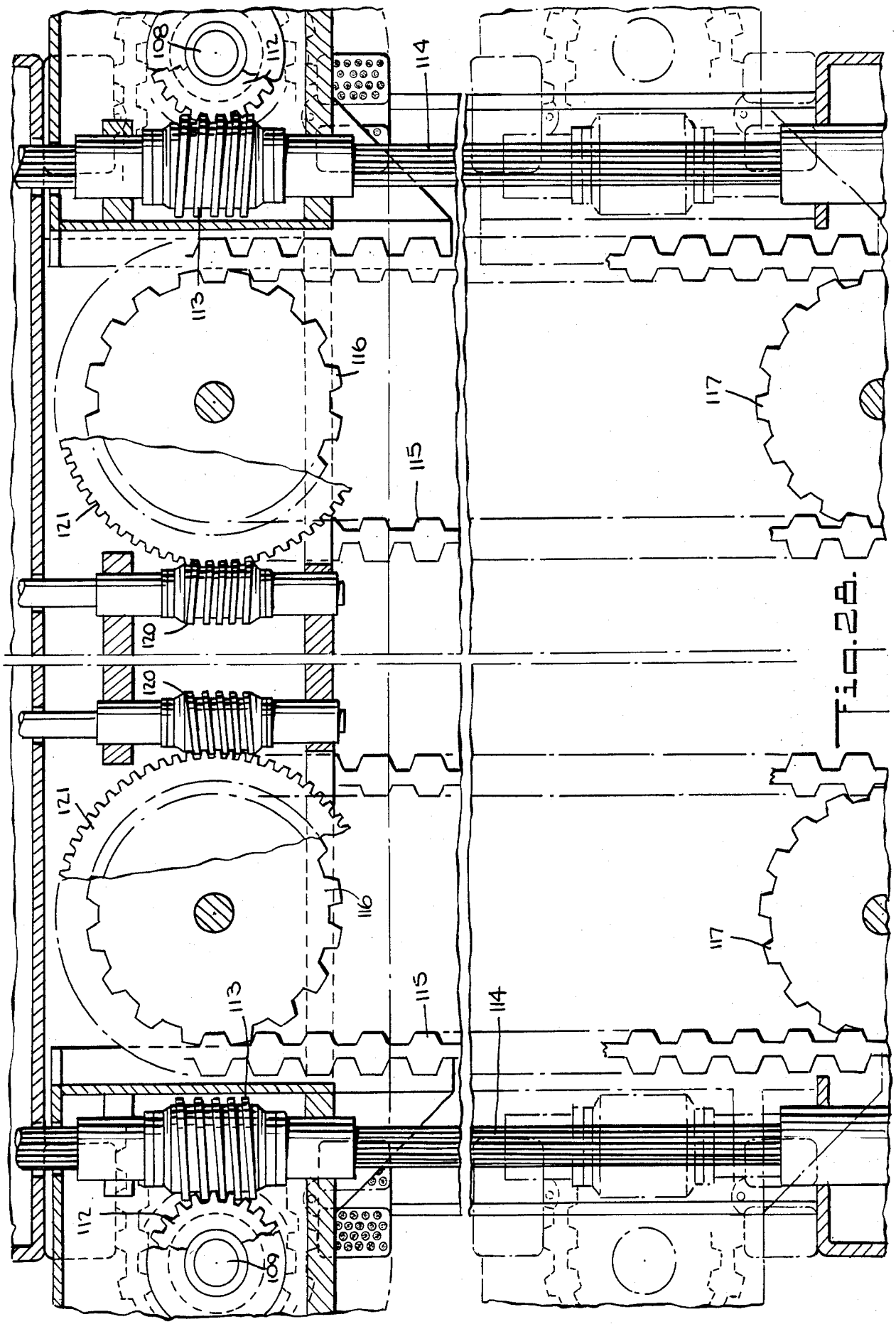

PLATE-PIN PANEL HEAT EXCHANGER AND PANEL COMPONENTS THEREFOR

BACKGROUND OF THE INVENTION

1. Technical Field

This invention relates to heat exchangers of the plate-fin type, particularly to large heat exchangers of this type adapted for use in ocean thermal energy conversion (OTEC) systems, and to plate-fin panels for use in such heat exchangers.

2. Background Art

Serious study of the possibilities of converting the potential energy represented by the difference in temperature between warm surface water and cold deep water in the ocean into useful form began at least fifty years ago with the researches of Georges Claude (see U.S. Pat. No. 2,006,985). Although the thermal energy available from ocean sources is essentially unlimited, the relatively low temperatures and small temperature differences involved result in very low plant thermal efficiencies, so that OTEC systems up to now have been uneconomic in comparison with fossil fuel plants. The dramatic increase in the cost of fossil fuels in recent years, however, has led in the cost of fossil fuels in recent years, however, has led to reconsideration of the economics of ocean thermal energy conversion.

Because of the small differences in temperature between the thermal source and thermal sink of an OTEC plant, and also because of the corrosive nature of, and marine organisms present in, the seawater medium, the effectiveness of the heat exchangers is a major factor in the efficiency and cost-effectiveness of an OTEC systems. Although conventional shell and tube exchangers have been proposed for OTEC plants, this type of exchanger presents serious drawbacks because of the difficulty of maintaining the seawater-side heat transfer surfaces free of fouling by algae and other marine organisms.

U.S. Pat. No. 4,055,145 issued on Oct. 25, 1977 to D. Mager and W. E. Heronemus and U.S. Pat. No. 4,062,189 issued on Dec. 13, 1977 to D. Mager, W. E. Heronemus, and P. M. J. Woodhead describe the use of plate-fin heat exchangers as evaporators and condensers for a closed-loop working fluid, such as ammonia, in an OTEC power generating plant. Based on an analytical study directed by the present inventor at the University of Massachusetts, and presented in a report entitled "Detailed Analytical Model of Rankine Cycle and Heat Exchangers for Ocean Thermal Difference Power Plants" under a grant, No. GI-34979, from the National Science Foundation, vertically arranged parallel plate-fin exchangers would permit maximum possible transfer of thermal energy between seawater flowing horizontally between spaced apart plate-fin units and working fluid flowing vertically within each unit. The above-mentioned U.S. Pat. No. 4,062,189, which is directed to a method of preventing the accumulation of microorganisms in OTEC systems by alternating warm and cold seawater flow through the heat exchangers, also mentions that plate-fin heat exchangers are adapted for cleaning by brushing or scraping the flat plate-fin panel surfaces.

Further analytical and experimental studies have demonstrated the feasibility of the plate-fin heat exchanger concept presented in the above-mentioned Pat. Nos. 4,055,145 and 4,062,189; they have also demonstrated the necessity of having all surfaces exposed to seawater made of corrosion resistant material and the importance of maintaining these surfaces free of even minor amounts of biological fouling to avoid loss of heat transfer effectiveness. Copper-nickel alloys are well known for their resistance to corrosion by seawater, and also for their resistance to bio-fouling. Heat exchangers made exclusively of such alloys, however, would be very expensive, making an OTEC plant difficult to justify on an economic basis. In addition, these corrosion-resistant alloys have relatively low heat conductivities; so that the temperature drop across the heat exchanger surfaces can be a significant percentage of the available thermal difference in such a plant.

Among metals having a high heat conductivity, aluminum has long been used for evaporators in refrigerator freezing units and in automotive radiators, as well as for small heat exchangers in other types of service, because of its relatively low cost, light weight, and capability of being extruded into tubular elements of complex cross section, including multi-tubular members. Examples of such elements are shown in U.S. Pat. Nos. 2,190,494; 2,212,912; 2,415,243; 3,416,600; 3,486,489; 3,662,582; 3,668,757; 3,920,069; and 4,043,015.

Aluminum heat exchanger tubes are typically assembled in groups and attached to headers by soldering, brazing, welding, or use of adhesives (U.S. Pat. No. 3,416,600). Alternatively, or in addition, nonmetallic sealant layers, such as synthetic resins or natural or synthetic rubber may be used (U.S. Pat. Nos. 2,303,416; 2,385,542; 3,633,660; and 3,993,126).

Although aluminum has excellent heat transfer properties, it is easily corroded by seawater unless it can be suitably protected. Combining dissimilar metals to take advantage of respective characteristics such as high thermal conductivity and resistance to corrosion and bio-fouling is difficult, however, because of the danger of electrolytic corrosion if the different metals are exposed to seawater.

In addition to the problems of effective heat transfer, corrosion, and biological fouling which they share in common with other types of heat exchangers, plate-fin exchangers present unique structural problems. For effective thermal operation, the plate-fin panels should be thin and closely spaced, yet have a large surface area. This means that the plate-fin panels are very flexible, but intermediate supports can interfere with optimum flow of fluid past the exterior surfaces of the panels, as well as provide growth sites for bio-organisms. Also the flat thin panel configuration presents headering problems compared with conventional shell-and-tube exchangers, in which the tubes are rolled into the headers.

SUMMARY OF THE INVENTION

It is an object of the present invention to provide plate-fin panel components for a heat exchanger, particularly for use in ocean thermal energy conversion systems, having both high heat conductivity and high resistance to corrosion.

Another object of the invention is to provide plate-fin panel components for a heat exchanger of the type described which are simple to fabricate and assemble.

It is another object of the invention to provide plate-fin panels for a heat exchanger, the panels having metal cores of high thermal conductivity and jackets of a different metal with high resistance to corrosion and bio-fouling.

Still another object of the invention is to provide a heat exchanger incorporating plate-fin panels of the type described designed for maximum protection against electrolytic corrosion of the panels and equipped with means for dislodging accumulated foreign matter from the heat exchanger surfaces contacted by seawater.

Another object of the invention is to provide a heat exchanger incorporating plate-fin panels of the type described above which can be readily assembled into groups of exchangers and disassembled from such groups for repair.

These and other objects are achieved by a plate-fin panel for a heat exchanger comprising:

a plurality of elongated thin rectangular parallelepipedal metallic members, each member having flat parallel exterior side surfaces and a plurality of passageways extending parallel to the longitudinal axis of the member, said members being arranged in a row with their respective exterior side surfaces aligned in two parallel planes;

means for providing tongue and groove interlocking engagement between adjacent edges of adjacent members; and elongated strip means of corrosion resistant material sealingly fastened to the longitudinal edges of the plate-fin panel.

The core of each panel member may be made as a single aluminum extrusion or as an assembly of several "plank-like" extrusions having interengagement means such as tongue-and-groove edges. The aluminum core is encased by two flanged sheet metal jackets of material which is resistant to seawater corrosion and biological fouling, such as a Cu-Ni, soldered, brazed, or glued to the faces of the aluminum extrusions.

Alternatively, each plate-fin panel may comprise a flat rolled plate forming each side wall and a corrugated sheet metal core forming the plurality of internal fins, the core being fastened to the side walls by soft solder or brazing metal. The side walls may be Cu-Ni sheets, or they may be steel or tin-plated steel sheets, the exterior surfaces of which are clad with Cu-Ni. The corrugated sheet metal core may be a steel sheet, which may be bare or plated with tin, and the internal passages in addition may be coated with a layer of pure iron or nickel.

The plate-fin heat exchanger of the invention comprises:

a plurality of elongated metal plate-fin panels arranged in parallel spaced apart relation, each panel having two rectangular side walls with flat exterior surfaces and a plurality of longitudinally extending fins connecting the interior surfaces of said side walls together in spaced apart relation, said fins creating a plurality of longitudinally extending, laterally spaced, internal passages between the two side walls;

first and second header chambers disposed at opposite ends of the plate-fin panels, each header chamber including a headering plate having a plurality of parallel slotted apertures, and the corresponding end of each plate-fin panel being inserted through a corresponding one of said slotted apertures and being fastened thereto, whereby the plurality of panels are maintained in said parallel closely-spaced relation;

rigid support members extending between the first and second header chambers;

means for dislodging accumulated foreign matter from at least a localized portion of the exterior surface of each panel side wall; and means mounted on said support members and connected to said dislodging means for moving said dislodging means to traverse the exposed exterior surface of each panel side wall between the header plates of said header chambers.

For optimum heat transfer effectiveness the thickness of and spacing between the side walls of each plate-fin panel desirably are very small compared with the length of the panel, such that the panel could buckle, even without the application of external load, if unsupported with its longitudinal dimension approximately vertical; so preferably said rigid support members exert an axially outward force against each header plate, whereby each plate-fin panel is maintained in tension in its longitudinal dimension to prevent buckling of said panel.

A preferred embodiment of the means for dislodging accumulated foreign matter from the seawater-exposed surfaces of the plate-fin panels comprises double-tufted brushes positioned in the spaces between adjacent plate-fin panels, with the tufts of each brush in wiping contact with the exterior surfaces of adjacent side walls of corresponding pairs of the panels. The brushes are mounted on suitable drive means for moving them across the entire exposed surfaces of each pair of panels for scrubbing off bio-organisms and other deposited material to maintain optimum heat transfer effectiveness of the heat exchangers. In an alternative embodiment, water jetting bars are substituted for the brushes.

These and other features of the invention, and their resulting advantages, will become more apparent from the following detailed description of the preferred embodiments of the invention, taken with the accompanying drawings.

BRIEF DESCRIPTION OF THE DRAWINGS

FIGS. 1 and 2 are perspective views showing two stages of assembly of one embodiment of a plate-fin heat exchanger panel.

FIG. 3 is a partial longitudinal section of the panel of FIGS. 1 and 2 taken in the direction of arrows 3—3 in FIG. 2.

FIG. 4 is a partial transverse section of the panel of FIGS. 1 and 2 taken in the direction of arrows 4—4 in FIG. 3.

FIGS. 5–7 are cross sections of extruded aluminum panel elements having different numbers and sizes of holes.

FIGS. 8–16 are partial transverse sections of alternative internal passage profiles for extruded heat exchanger panels.

FIG. 17 is a transverse section of an alternative embodiment of a plate-fin heat exchanger panel.

FIG. 18 is an elevation view, in section, of a heat exchanger using plate-fin panels.

FIG. 21 is an elevation view, in section, of one form of upper headering chamber.

FIG. 22 is a partial section view taken in the direction of arrows 22—22 in FIG. 21.

FIG. 23 is a perspective view of another form of upper headering chamber.

FIG. 24 is an elevation view, in cross section, of the headering chamber of FIG. 23.

FIG. 26 is a perspective view of a panel surface brushing unit.

FIG. 27 is a plan view, partly in section, of the support structure and drive means for the brush units of a heat exchanger assembly taken in the direction of arrows 27—27 in FIG. 26.

FIG. 28 is an elevation view, partly in section, of the brush unit drive means of FIG. 27.

DETAILED DESCRIPTION OF THE PREFERRED EMBODIMENTS

Figure 19:
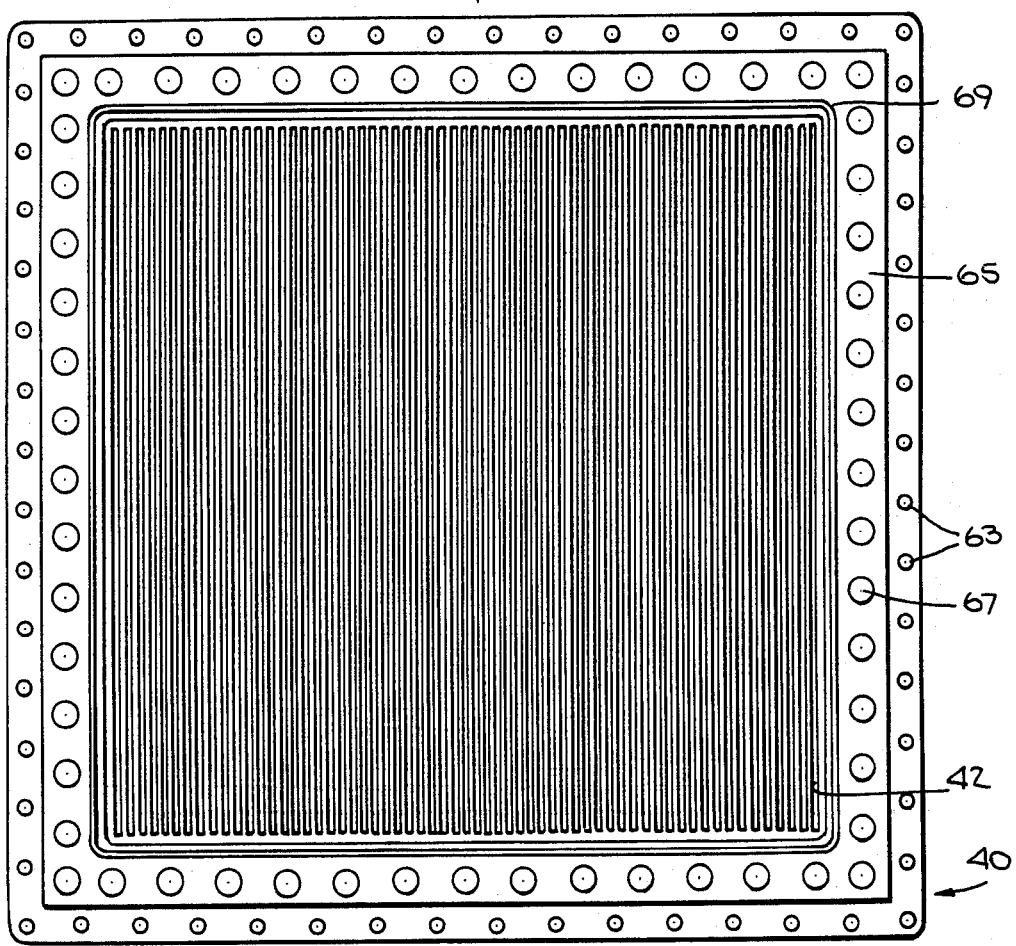
FIG. 19 is a plan view of the upper header of the heat exchanger taken in the direction of arrows 19—19 in FIG. 18.

With reference to FIGS. 1-4, one embodiment of a plate-fin panel member 1 includes one or more elongated plank-like aluminum extrusions 2, preferably encased in sheet metal jackets 3 having a corrosion resistant outer surface of a material such as Cu-Ni.

Each extruded aluminum core element is in the form of an elongated thin rectangular parallelepiped having flat parallel side surfaces 4 and longitudinal edges, of which one is formed with a tongue 5 and the other with a groove 6, so that adjacent ones of the extruded elements can be fitted together in tongue and groove fashion. Each aluminum extrusion 2 also includes a plurality of longitudinally extending holes 7, such that the element in cross section is in the form of two parallel plates 8 defined by the side surfaces 4, joined by a plurality of fins 9 defined by the material remaining between adjacent holes.

The plate-fin panel member is assembled by first interlocking the necessary number of extruded aluminum elements 2 together in tongue and groove fashion and then applying flanged plates 3 to each side surface of the resulting panel, as shown in FIGS. 1 and 2, so that the flanges of the two metal jackets abut to form a longitudinal rib or tongue 10 along each longitudinal edge of the panel member. The jackets are attached to the core elements to provide both good physical and thermal contact, preferably by soft solder, by brazing, or by an adhesive. If assembly is by brazing, either vacuum oven fluxless brazing or induction heated fluxed brazing processes can be used. In the latter case, flux gathering passages can be provided in the exterior surface of the core. The adhesive may be a synthetic resin or other type of adhesive. Two preferred materials are an epoxy thermoset catalyzed heat cure adhesive heavily loaded with finely ground metal powder (e.g., silver or aluminum), such as that sold by TRA-CON, of Medford, Mass. under the name "Tra-Bond BB 2143", or a pressure-and-heat activated, pressure-sensitive adhesive film loaded with approximately 65% by volume of finely ground aluminum powder to provide high thermal conductivity across the adhesive layer. Alternatively, a lead-foil or aluminum-foil based pressure and heat sensitive adhesive film of high thermal conductivity can be used.

Preferably, the adhesive film is coated directly on to the aluminum panel core, rolled to a desired thickness of about 0.001 inch, and allowed to dry. The sheet metal jackets can then be placed in position on each side of the panel core and bonded to the core by rolling between heated compression rollers.

Since the soft solder, braze metal, or aluminum powder in the adhesive will be exposed at the line of abutment of the flanges of the sheet metal jackets, it is necessary to provide means for covering the exposed dissimilar metal joint by means such as grooved edge strips 11, preferably made of a synthetic plastics material and glued to the edge of the panel member by an insulating glue or adhesive. The assembled panel member, as shown in FIG. 4, thereby presents an exterior surface of corrosion resistant material, the flat side surfaces 12 thereof being a corrosion resistant metal, and the longitudinal edges being a synthetic plastics material.

As stated above, the sheet metal jackets 3 preferably have at least their exterior surfaces composed of a Cu-Ni alloy. If desired the entire jacket can be composed of Cu-Ni, or other corrosion resistant metals such as titanium or CRES alloys may be used. Alternatively, as shown in FIGS. 3 and 4, the jacket may be formed from a steel sheet 13 clad on one side with a copper-nickel alloy layer 14. A typical panel side sheet, for example, could comprise a sheet of SAE 1020 carbon steel, either bare or plated with tin, approximately 0.020 inch thick and on one side of which is rolled a layer of Cu-Ni alloy 715 approximately 0.015 inch thick. If tin plated steel is used, a one-mil thick layer of tin will be sufficient. Tin plated steel is particularly desired if the jackets are to be bonded to the aluminum core by soft soldering or brazing. Instead of a single Cu-Ni alloy layer 14, it might be desirable to provide an outer cladding of two different Cu-Ni alloys in two layers rolled together, the outer layer being anodic to the inner layer, so that the cladding can "heal" itself if local pitting should occur.

Various geometrics of aluminum extrusions are possible, depending on factors such as available extrusion press capacity, desired panel length and stiffness, and ratio of internal to external heat transfer surface area.

FIGS. 5-7 illustrate three contemplated geometries using holes of circular cross-section. FIG. 5 represents an extrusion having an overall width of approximately 9 inches, a thickness of approximately 5/16 inch and 34 holes of approximately 3/16 inch diameter. This arrangement provides a ratio of internal passage surface area to panel face area of approximately 2.5. FIG. 6 shows a second extrusion having the same overall width as that of FIG. 5, a thickness of approximately ¼ inch, and 47 holes of approximately ⅛ inch diameter. This arrangement provides a ratio of internal passage surface area to panel face area of approximately 2.1.

Since for OTEC service the heat exchanger panels are preferably quite long, at least 12 feet and desirably as long as 30 feet, the embodiments of FIGS. 5 and 6 require an extrusion press of very large capacity. FIG. 7 illustrates to comparable scale an extrusion geometry suitable for smaller presses, the overall width being only about 2 inches, the thickness being about 11/32 inch, and there being 7 holes of approximately 3/16 inch diameter.

It will be appreciated, of course, that the geometries and size relations given above for FIGS. 5-7 are only exemplary; they are given to indicate the general dimensions that appear at the present time to be optimum for OTEC plant heat exchangers. As mentioned above, the extrusion process allows essentially unlimited opportunity to vary the cross-sectional shape of the internal passages to optimize heat transfer effectiveness, strength, and material utilization. FIGS. 8-16 illustrate various possible internal passage cross-sections including a circular hole 15 with two tongues 16 (FIG. 8), a circular hole 17 with four tongues 18 (FIG. 9), a square hole 19 with two tongues 20 (FIG. 10), a square hole 21 with four tongues 22 (FIG. 11), a square hole 23 with six tongues 24 (FIG. 12), a square hole 25 with rounded corners 26 (FIG. 13), a square hole 27 with fillet corners 28 (FIG. 14), a square hole 29 with sharpest corners 30 (FIG. 15), and a triangular hole 31 (FIG. 16).

Any of the above extrusion geometries can be used for the cores of a panel assembly as illustrated in FIGS. 1-4, and of course still other hole shapes can be used, if desired.

An alternative form of panel assembly 32 is illustrated in FIG. 17. In this embodiment, a finning core 33 of corrugated sheet metal is substituted for the extruded aluminum core of FIGS. 1-16. Many shape variants are possible for the corrugated core; the form illustrated in FIG. 17 is a rectangular zig-zag shape which alternates flat surface portions 34 with transverse fin portions 35. For optimum design on a strength basis, the relation between the thickness of the sheet metal core stock and the length of the flat surface portions 33 should be determined such that the tensile strength of the bonded joints 36 between these portions and the flanged sheet metal jackets 3 will be equal to the tensile strength of the transverse fin portions 35, the strength in each case being sufficient to withstand the design pressure differential between the internal and external working environments.

The flanged jackets 3 of the corrugated core panel member 32 of FIG. 17 are identical in composition to the jackets of the extruded aluminum core version of FIGS. 1-4. The finning core stock of this embodiment is preferably carbon steel sheet, either bare or tin plated, in a thickness range of about 0.006 to about 0.010 inch. The jackets may be bonded to the side surfaces of the core by soft solder or brazing metal. Depending on the intended working fluid to be used in the internal passages, it may be desirable to provide an interior coating for the passages after assembly, to avoid any electrolytic corrosion caused by the dissimilar bonding and panel metals.

Preferred coating materials for the internal passages are pure iron or nickel. A coating of either metal can be applied easily after the panel member is assembled by immersing the panels, with passages vertical, into an electrolyte solution. Pure iron or nickel electrode rods are then lowered into each one of the internal passages, and electroplating is carried out until a coating of the desired thickness (e.g., at least 0.005 inch) of the rod metal is deposited on the surfaces of the internal passages.

The maximum width of each plate-fin panel member 32 is limited by the size of available rolling mills for producing the flanged sheet metal jackets and the corrugated sheet metal cores. If a panel wider than a single one of the panel members 32 is desired, then the necessary number of panel members can be assembled in tongue-and-groove fashion by means of intermediate locking elements, such as strip 37 having grooves 38 in opposite sides 39 which mate with the ribs or tongues 10 formed by the abutting flanges of jackets 3. Locking strips 37 can be made of the same plastics material as edge strips 11 and can be attached to the adjacent panel members by the same adhesive, or they can be made of the same metal as the surface layer 14 of the panel members, to assure that there will be no chance for electrolytic corrosion of the panels.

It will be clear that locking strips 37 can be used also to assemble two or more panel members of the extruded aluminum core type of FIGS. 1-4 when a panel wider than the width of flanged jackets 3 is desired. For example, a preferred embodiment of a heat exchanger employing plate-fin panels and adapted for use as both a condenser and an evaporator in an OTEC power plant contains a multiplicity of plate-fin panels 4 feet wide by up to 30 feet long; whereas the largest rolls available for forming the flanged jackets 3 may have a capacity for a maximum width of only about two feet.

FIG. 18 is an elevation view, in section, of such a heat exchanger 40, in which plate-fin panels 32 are arranged vertically and are maintained in closely-spaced parallel relation by an upper headering casting 41 and a lower headering plate 42. Each plate 32 extends through a corresponding elongated slot 43 in the upper headering casting and an identical slot 44 in the lower headering plate, and the panels may be secured to the headering elements by fillet welds 45 and 46, respectively. These fillet welds may be either continuous or intermittent, the former giving maximum fluid tightness even though probably not necessary from a strength standpoint.

If the panels have an extruded aluminum core, as in FIGS. 1-4, the upper headering casting and lower headering plate should also be made of aluminum; if the panels are fabricated from steel sheets, as in FIG. 17, the upper and lower headers should be steel. As shown in FIG. 2, the flanged jackets 3 of the aluminum-core panels preferably do not extend to the upper (or the lower) edge of the core, so that only the aluminum core passes through the slots in the header plates, and the aluminum core can be welded directly to the aluminum headering plates. This construction, of course, leaves a dissimilar metal joint between the jackets and the core on the heat transfer fluid (e.g., seawater) side of the headering plates.

A particular feature of the heat exchanger design of the present invention is the provision of an upper layer 47 and a lower layer 48 of an inert sealing medium, such as a glass-like filled epoxy resin potting compound, in the spaces immediately below the upper headering casting 41 and above the lower headering plate 42, respectively. In addition to protecting the joints between the core and the cladding jackets against contact by the heat transfer liquid flowing past the exterior surfaces of the panels, these layers of potting compound seal the panels to the headers, with a bond that may be strong enough to obviate the need of any fillet welds at all.

The heat exchanger assembly proceeds as follows. A number of heat exchanger panels equal to the number of slots in the headers are stood upright, with suitable stiffening spacer panels interleaved between each adjacent pair of heat transfer panels. As an example, the heat exchanger panels may be 4 feet wide, from 12 to 30 feet long, and approximately 5/16 inch thick. The slotted headers preferably are square, and the spacing between panels is desirably about ¼ inch minimum to ½ inch maximum. For a spacing of ½ inch between panels, 58 panels can be assembled in a 4 foot square header configuration, as shown in FIG. 19.

An upper headering skirt 49, preferably laminated from glass fiber reinforced plastic or molded from a high strength glass fiber filled thermoplastic molding resin, is lowered over the upright bundle of accurately spaced heat exchanger panels 32 prior to sliding the panel upper ends into the slots of the upper headering casting 41 and fillet welding each panel in place, if necessary. The upper headering skirt 49 is then raised and bonded to the underside of the upper headering casting 41 using, for example, a resin-rich glass fiber mat approximately 0.02 to 0.06 inch thick. The mat will accommodate minor deviations in surface finish, thereby providing a sealing bond to the underside of the headering casting, with little or no need for first machining the casting.

After completion of the upper headering assembly, the lower headering plate is installed in similar fashion, after first sliding a lower headering skirt 50 up the lower portions of the panels, while suspending the panels 32 from the upper headering casting by means not shown. Before the lower headering skirt 50 is bonded to the lower headering plate 42, but after fillet welding the panels to the lower headering plate, a lower chamber member 51, termed a liquid pot casting, is sealingly fixed to the lower headering plate by a circumferential fillet weld 52 or other appropriate sealing means. The liquid pot casting serves both as a support base for the heat exchanger and as a chamber for receiving working fluid in liquid form either from the internal passages of the panels, if the heat exchanger is functioning as a condenser, or from a feed pipe 53 (see FIG. 25) connected to inlet or drain fitting 54.

The cavity between the lower headering skirt 50 and the lower headering plate 42 is then filled with potting compound in the same manner as for the upper end of the heat exchanger. When cured, the potting compound in the upper and lower headering skirt cavities serves the triple functions of sealing against leakage between the heat transfer fluid side (external surfaces of heat exchanger panels) and the working fluid side (internal passages of the panels) through the slots of the headering plates, protecting the dissimilar metal joint between the jackets and the core of each panel against electrolytic corrosion, and bonding the panels to the headering plates, with sufficient strength to obviate the need for fillet welds in many cases.

After the upper and lower ends of the panels are fastened and sealed to the respective upper and lower headering castings, rigid side support members 55 are fastened to the upper and lower headering structures on the two sides parallel to the heat exchanger panels. These side members 55 are laminated in several parts 56, 57, 58 from glass fiber reinforced epoxy resin and then assembled with epoxy resin adhesive and appropriate fasteners, such as nuts and bolts 59 which are themselves locked in place with adhesive resin. The design of the side members should include box, channel, or I-beam sections, as appropriate, to supply columnar rigidity, because the heat exchanger panels 32 are too thin and flexible to support themselves. In addition, since the flow of heat transfer fluid (e.g., seawater) past the exterior faces of the panels should be as unobstructed as possible, there can be structural support members on the other two sides of the heat exchanger, except for suitably streamlined diagonal braces (not shown).

The preferred method of assembling the side members 55 is to first heat the panels 32, for example by inductive heating, to a temperature above their intended operating temperature (e.g., about 250° F. for OTEC applications), after which the side members are attached by suitable fasteners, such as bolts 60, 61, 62 and 63. This assures that the panels 32 will be maintained in tension by the side members after the panels cool down, so no buckling problems will occur within the intended operating temperature range.

The final element of heat exchanger assembly 40 is a vapor dome 64, a lower flange 65 of which is clamped to an upper flange 65 of the upper headering casting 41 by nuts and bolts 66, after first installing a gasket or O-ring 67 in a groove 68 in the face of flange 65. The vapor dome has an upper flange 70 surrounding an opening 71 for inlet or egress of vaporized working fluid to or from the heat exchanger, the flange 70 permitting attachment of a connecting pipe 72 by means of nuts and bolts 73.

If the heat exchanger is intended for use as a condenser, the vapor dome 64 can have an open interior. If the exchanger is intended to function as an evaporator in, for example, an OTEC power plant, the vaporized working fluid exiting from the upper ends of the panel internal passages will typically carry entrained moisture particles which could damage the nozzles or blades of a downstream turbine. It is desirable, therefore, to provide some means within the vapor dome for separating entrained liquid from the vapor.

Figure 20:
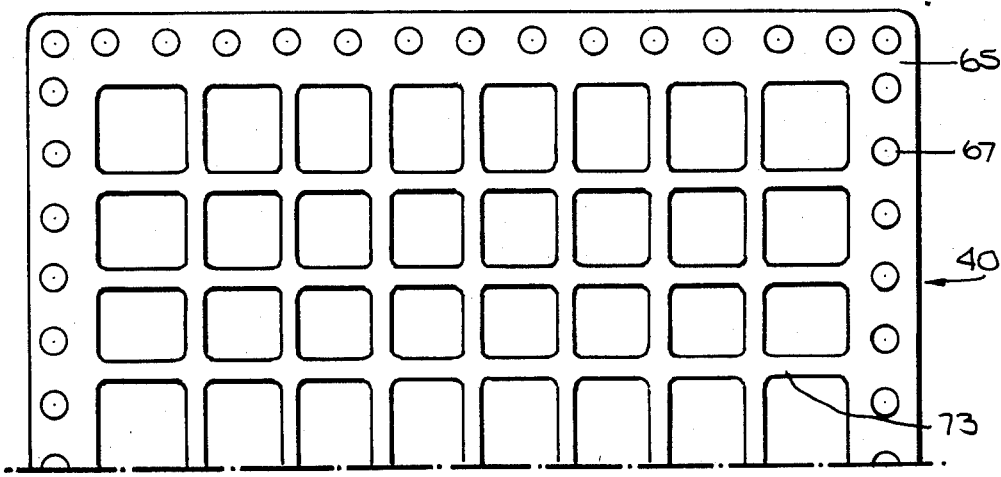
FIG. 20 is a plan view of the upper header chamber of the heat exchanger taken in the direction of arrows 20—20 in FIG. 18.

As shown in FIGS. 18 and 20, simple baffling in the form of a rectangular grid 74 may suffice for moisture particle removal. If more effective separation is required, the grid may be supplemented by dished mesh pads 75 positioned in the entrances to the openings of grid 74, as shown in FIGS. 21 and 22. The mesh pads may be secured in place by any suitable means, such as studs 76 which are threadably engaged into tapped holes 77 in the grid and upon which are installed successively a grid frame 78 for the individual mesh pads, a supporting grid plate 79, and a grid trough 80 for collecting liquid separated from the upflowing working fluid vapor in the mesh pads and for returning the liquid to the inlet of a feed pump (not shown). As shown in FIG. 22, the grid trough is fastened to the studs 76 by pins inserted into cross-drilled holes 81.

Alternatively, a vapor dome 82 with an integrally formed cyclone separator in the form of a helical passage 83 can be used, as shown in FIGS. 23 and 24. If desired, a cyclone separator as shown in FIGS. 23 and 24 can be combined with a mesh pad demister like the arrangement of FIGS. 21 and 22.

Figure 25:
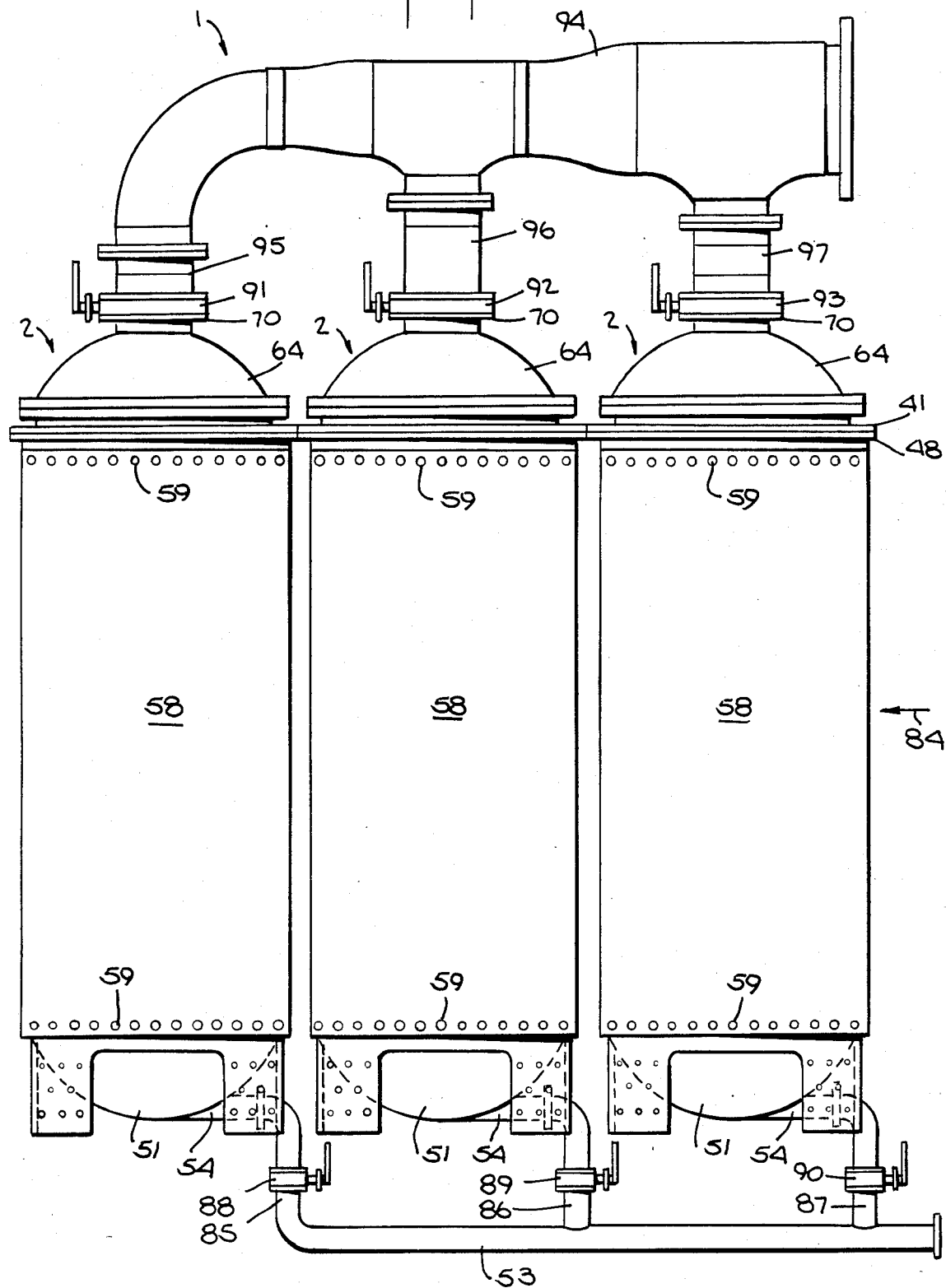

With reference next to FIG. 25, the heat exchanger design described above lends itself readily to mounting the exchangers in tandem, with respect to flow of the heat transfer fluid, in applications where the available temperature difference dictates a longer flow path for the heat transfer fluid than is provided by the panel width of only a single heat exchanger.

For example, in a typical ocean thermal difference power plant in which the available source differential (between hot and cold seawater) is 20° F., it is estimated that an optimum design would require 12 feet of flow path across the panels to produce a change of 3° F. in the temperature of the heat exchanger fluid. This flow path distance can be achieved with three heat exchangers, each having panels 4 feet wide, arranged in series with respect to seawater flow in the direction of arrow 84 (additional covers to contain the seawater flow between units are not shown, for clarity).

The three heat exchanger units are connected to liquid working fluid header 53 by branch lines 85, 86, and 87, which contain wafer-type butterfly shutoff valves 88, 89, and 90, respectively. Similar valves 91, 92, and 93 connect the vapor domes of the heat exchangers to a vapor header 94 via respective branch pipes 95, 96, and 97. This arrangement makes it a simple matter to isolate and remove any one of the heat exchangers for repair or replacement, if necessary.

Figure 30:
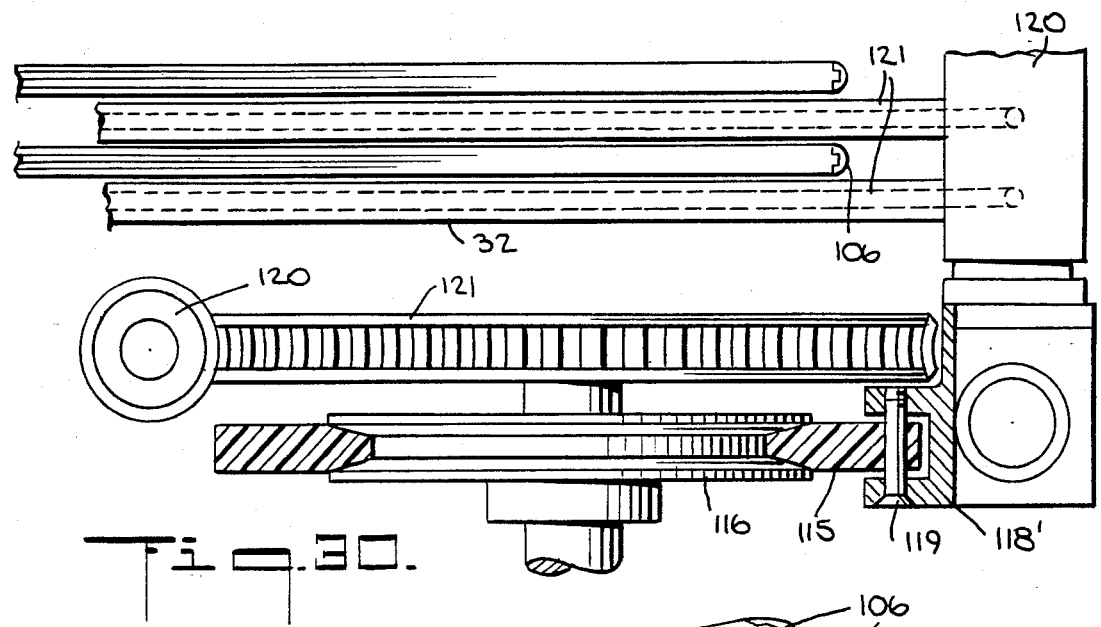
FIG. 30 is a partial plan section view of the water jetting bar and drive mechanism taken in the direction of arrows 30—30 in FIG. 29.
Figure 29:
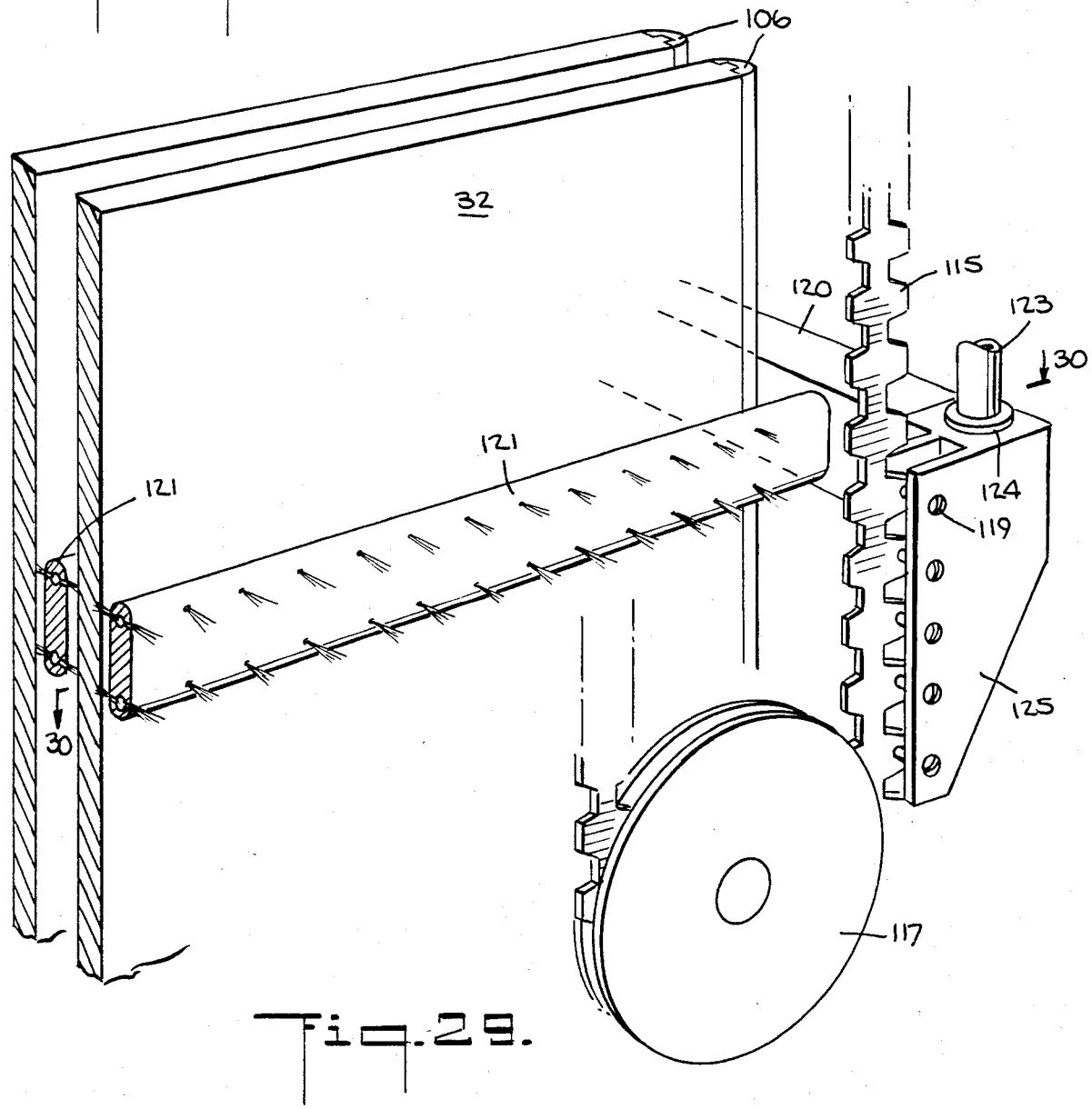
FIG. 29 is a perspective view of alternative water jetting bars and drive mechanism for dislodging foreign matter from the panel surfaces.

As mentioned above, if the plate-fin heat exchangers of the present invention are used for OTEC service, with the external surfaces of the plate-fin panels exposed to seawater, there will be inevitably some accumulation of foreign matter on these surfaces. Although cladding the panel surfaces with a copper-nickel alloy, preferably either 70-30 or 90-10 cupro-nickel, will probably avoid macro-fouling by barnacles and the like, there will be some level of micro-fouling by slime layers which will adversely affect heat transfer capability. Certainly if bare extruded aluminum panels without cladding are used, rapid build up of both slime and hard encrustations of marine growth can be expected. Even with bare aluminum panels, however, such buildup can be completely prevented by periodic cleansing of the surfaces exposed to seawater. One embodiment of means for dislodging accumulations of such foreign matter is illustrated by FIGS. 26–28, and an alternative embodiment is shown in FIGS. 29 and 30.

With reference first to FIGS. 26–28, a preferred system for cleaning the exterior surfaces of the heat exchanger panels by mechanical brushing includes a plurality of double-tufted brushes 101 positioned in the spaces between each pair of adjacent plate-fin panels, with the tufts of each brush in wiping contact with the facing side wall surfaces of the adjacent panels. The brushes are attached by fastening means such as pins 102 to endless carrier means 103 trained around driving wheels or sprockets 104 and idler wheels or sprockets 105 positioned externally of the opposite longitudinal edges 106 and 107 of the panels. The carrier means is preferably a toothed belt type, such as is sold under the registered trademark "RUBBER-CHAIN". If desired, the driven or idler wheel 105 (see FIG. 26) can also be a driving or powered wheel in order to distribute the driving load more equally. This alternative is shown in FIG. 27.

The sprockets 104 on one side of the panels are fixed to a drive shaft 108 which extends adjacent to the edges 106 and perpendicular to the planes of the panels. The sprockets 105 are similarly mounted on a shaft 109 extending adjacent to the opposite edges 107 of the panels parallel to and at the same level as shaft 108. Each of the shafts 108 and 109 is maintained in spaced relation to the adjacent panel edges by a plurality of grooved wheels 110 and 111 which are interposed between each pair of sprockets 104 and 105 and ride against panel edges 106 and 107, respectively as shown best in FIG. 27.

Grooved wheels 110 and 111 are freely rotatable on their respective shaft 108 and 109, so that the brushes can be driven through the sprockets by rotation of the shafts, independently of the rolling of the grooved wheels along the respective edges of the panels. The shafts 108 and 109 receive power through four gears 112, mounted one at each end of each shaft and driven by worms 113 which are slidably mounted on vertical splined drive shafts 114. These drive shafts 114 are turned by an electric or hydraulic motor (not shown) located above the vapor dome of each heat exchanger and operatively coupled to the shafts through appropriate power transmission means, such as gears, chains, or belts.

Rotation of shafts 114 by the drive motor causes rotation of shafts 108 and 109 through the worm and gear couplings, thereby driving the brushes 101 on each flexible carrier means 103 in a closed loop path between the corresponding pair of adjacent panels. The bristles of the double-tufted brushes are trimmed to give an appropriate wiping contact angle with the opposed panel faces, effectively wiping all slime accumulation from the surfaces in the brush path.

The brushes will clean themselves as their bristles spring free at the end of each pass across the width of the panels. The rounded plastic edge strips 11 provide a funnel opening to ease the entrance of each brush as the flexible carrier means draws it into the space between the corresponding panels for the return pass. Because the multiplicity of brushes attached to each flexible carrier provides a high degree of redundancy, a number of brushes can become worn or broken before it is necessary to take the heat exchanger out of the system for replacement of the brushes.

To enable the brushes to clean the entire panels from top to bottom of the heat exchanger, vertical drive means are provided for translating the pair of horizontal shafts 108 and 109 in unison parallel to the longitudinal edges of the panels. These vertical drive means include endless flexible carrier means 115 extending parallel and adjacent to the opposite longitudinal edges of the plate-fin panels at each end of each shaft 108 and 109. Each carrier means 115 passes around an upper drive sprocket (not shown) and a lower idler sprocket 116 and is attached to the corresponding end of one of the horizontal shafts 108 and 109 by means such as a bracket 117 via bolts 118.

Each vertical flexible carrier means 115 is driven by an electric or hydraulic motor (not shown) coupled to the upper drive sprockets 116 through a corresponding worm 120 and gear 121, as well as an appropriate synchronizing transmission (not shown). The motor for the vertical drive means is reversible and controlled by motion limit switches (not shown) suitably positioned to stop and reverse the travel of the attachment brackets 118 at the upper and lower headering members.

The brush type cleaning system is the preferred arrangement for exchangers having a panel spacing of not less than ½ inch. Narrower spacing will lead to undesirable flimsiness of parts. To promote turbulent flow and thus improved heat transfer, however, a spacing between panels of less than ½ inch may be advantageous. An alternative cleaning system, using water jets, is adapted for use with exchangers having panels spaced closer than ½ inch.

With reference to FIGS. 29 and 30, a water jetting cleaning system is shown which can use the same vertical drive means as described above for the brush type arrangement of FIGS. 26–28. The brush drive mechanism is replaced however, by a pair of support members 120 (only one shown) extending adjacent to opposite longitudinal edges 106 and 107 of the plate-fin panels, the axes of the support members being perpendicular to the planes of the panels. Elongated hollow jetter bars 121 are positioned in the spaces between each pair of adjacent plate-fin panels, each jetter bar extending horizontally between the pair of support members 120 and having opposed rows of spray orifices 122 facing the exterior surfaces of the adjacent side walls of the corresponding pair of panels.

Means for delivering liquid (e.g., seawater) under pressure to the hollow bars 121 for jetting from the spray orifices against the adjacent panel surfaces include a flexible pressure hose 123 connected to a fitting 124 on a support bracket 125 and leading to a longitudinal passage in support member 120, which serves as a distribution header to each jetter bar. The upper end of the pressure hose is wound on a takeup reel (not shown) and supplied with liquid from a pressurizing source such as a pump (not shown).

The jetter bars thus deliver high velocity streams which impinge against the opposed faces of the adjacent plate-fin panels. A vertical drive means essentially the same as previously described moves the bars in unison between upper and lower units of travel. Experiments indicate that either type of cleaning system (brush or water jet) needs to be operated no more than once or twice each day to insure freedom from even the thinnest of slime layers, although it is possible that continuous operation would maximize heat transfer coefficients on the seawater side of the panels.

The foregoing description of the preferred embodiments demonstrates, therefore, that the present invention provides a heat exchanger arrangement particularly adapted for ocean thermal energy conversion plants that combines low cost and ease of construction with high heat transfer efficiency, and which can be maintained at peak effectiveness for extended operating periods. Of course, the disclosed heat exchangers are not limited in application to OTEC plants but can be used in any heat exchanger application involving relatively low maximum temperatures.

I claim:

1. A plate-fin heat exchanger adapted for use in ocean thermal energy conversion systems, the heat exchanger comprising:

a plurality of elongated metal plate-fin panels arranged in parallel spaced apart relation, each panel having two rectangular side walls with flat exterior surfaces and a plurality of longitudinally extending fins connecting the interior surfaces of said side walls together in spaced apart relation, said fins creating a plurality of longitudinally extending, laterally spaced, internal passages between the two side walls;

first and second header chambers disposed at opposite ends of the plate-fin panels, each header chamber including a headering plate having a plurality of parallel slotted apertures, and the corresponding end of each plate-fin panel being inserted through a corresponding one of said slotted apertures and being fastened thereto, whereby the plurality of panels are maintained in said parallel closely-spaced relation;

rigid support members extending between the first and second header chambers;

means for dislodging accumulated foreign matter from at least a localized portion of the exterior surface of each panel side wall; and means mounted on said support members and connected to said dislodging means for moving said dislodging means to traverse the exposed exterior surface of each panel side wall between the header plates of said header chambers, wherein the thickness of and spacing between the side walls of each plate-fin panel are very small compared with the length of the panel, such that the panel could buckle even without the application of external load if unsupported with its longitudinal dimension approximately vertical, and said rigid support members exert an axially outward force against each header plate, whereby each plate-fin panel is maintained in tension in its longitudinal dimension to prevent buckling of said panel.

2. A heat exchanger according to claim 1 wherein each plate-fin panel comprises a plurality of plank-like members positioned edge-to-edge, each plank edge having interengagement means for keying said edge to mating interengagement means of an adjacent panel.

3. A heat exchanger according to claim 2 wherein said interengagement means comprises a tongue formed on an edge of one plank-like member and a mating groove formed in the contiguous edge of an adjacent panel.

4. A heat exchanger according to claim 1 wherein at least part of the exterior surface of each panel comprises a layer of heat conductive material which is resistant to corrosion and biological fouling.

5. A heat exchanger according to claim 4 wherein said exterior layer terminates at a location spaced from each end of each panel, said heat exchanger further comprising a resin layer contiguous to each header plate and covering the terminal location of said exterior layer for preventing electrolytic corrosion between said exterior layer and the underlying material of the panel side walls.

6. A heat exchanger according to claim 1 wherein the side walls and fins of each panel comprise an aluminum extrusion.

7. A heat exchanger according to claim 6 wherein the exterior surface of each panel comprises a layer of Cu-Ni cladding soldered to said aluminum extrusion.

8. A heat exchanger according to claim 6 wherein the exterior surface of each panel comprises a layer of Cu-Ni cladding brazed to said aluminum extrusion.

9. A heat exchanger according to claim 6 wherein the exterior surface of each panel comprises a layer of Cu-Ni cladding glued to said aluminum extrusion.

10. A heat exchanger according to claim 9 wherein the glue comprises a thermosetting epoxy resin loaded with aluminum powder to provide good heat conduction.

11. A heat exchanger according to claim 9 wherein the glue comprises a pressure and heat activated adhesive including approximately 65 percent by volume of aluminum powder.

12. A heat exchanger according to claim 1 wherein each panel comprises a flat rolled plate forming each side wall, a corrugated sheet metal core forming said plurality of fins, and means for fastening said core to said side walls.

13. A heat exchanger according to claim 12 wherein said corrugated sheet metal core has right angle bends.

14. A heat exchanger according to claim 12 wherein said fastening means comprises soft solder.

15. A heat exchanger according to claim 12 wherein said fastening means comprises brazing metal.

16. A heat exchanger according to claim 12 wherein said flat rolled side walls comprise Cu-Ni clad steel plates.

17. A heat exchanger according to claim 16 wherein the Cu-Ni cladding of said side wall plates comprises two layers of cladding, the outer layer being anodic to the inner layer.

18. A heat exchanger according to claim 12 wherein said flat rolled side walls comprise tin-plated steel plates.

19. A heat exchanger according to claim 12 wherein said flat rolled side walls comprise Cu-Ni plates.

20. A heat exchanger according to claim 12 wherein said core comprises a corrugated steel sheet.

21. A heat exchanger according to claim 12 or 14 wherein the internal passageways are coated with a layer of pure iron.

22. A heat exchanger according to claim 12 or 14 wherein the internal passageways are coated with a layer of nickel.

23. A heat exchanger according to claim 12 wherein said core comprises a corrugated tin-plated steel sheet.

24. A heat exchanger according to claim 1 wherein said rigid support members being fastened to opposite sides of the first and second header chambers parallel to said plurality of panels.

25. A heat exchanger according to claim 24 wherein said rigid support members are made of epoxy resin reinforced with glass fibers.

26. A heat exchanger according to claim 1 wherein said first header chamber comprises a grating parallel to and spaced from the headering plate, mesh pads positioned in the openings of said grating, and an opening on the other side of the grating from the headering plate, whereby fluid passing through the internal passageways and said opening will traverse said mesh pads.

27. A heat exchanger according to claim 1 wherein said one header chamber comprises an opening for fluid spaced from the headering plate and a spiral passageway between the headering plate and the opening, such that fluid passing through the internal passageways of the panels and the opening will traverse the spiral passageway.

28. A heat exchanger according to claim 1 wherein said means for dislodging accumulated foreign matter comprises double-tufted brushes positioned in the spaces between adjacent plate-fin panels, with the tufts of each brush in wiping contact with the exterior surfaces of adjacent side walls of corresponding pairs of said panels.

29. A heat exchanger according to claim 28 wherein said means for moving the dislodging means comprises:
- a pair of shafts extending adjacent to the opposite longitudinal edges of said plurality of plate-fin panels, the axes of the shafts being perpendicular to the planes of the panels;
- means for supporting said shafts for rotation about their longitudinal axes and for translation in a plane parallel to the longitudinal edges of said panels;
- a plurality of spaced driving wheels fastened coaxially to one of said shafts, each driving wheel being aligned with the space between a corresponding pair of plate-fin panels;
- a corresponding plurality of wheels mounted on the other shaft;
- an endless flexible carrier means trained around each driving wheel and the corresponding wheel on the other shaft;
- means for fastening a plurality of said doubletufted brushes to said carrier means;
- means for translating said pair of shafts in unison parallel to the longitudinal edges of said panels; and
- means for rotatably driving said one shaft at any longitudinal position of said shafts.

30. A heat exchanger according to claim 29 wherein said means for supporting said shafts for rotation about their longitudinal axes comprises roller means rotatably mounted on each of said pair of shafts between at least two pairs of the driving and of the driven wheels, respectively, each roller means bearing against a longitudinal edge of a corresponding plate-fin panel.

31. A heat exchanger according to claim 30 wherein the means for translating said pair of shafts in unison parallel to the longitudinal edges of said panels comprises:
- endless flexible carrier means extending parallel and adjacent to the opposite longitudinal edges of said plate-fin panels;
- means for attaching each end of each of the pairs of shafts to a corresponding one of the longitudinal endless flexible carrier means for longitudinal movement thereby; and
- means for driving all of said longitudinal endless flexible carrier means in synchronism.

32. A heat exchanger according to claim 1 wherein said means for dislodging accumulated foreign matter comprises a pair of support members extending adjacent to opposite longitudinal edges of said plurality of plate-fin panels, the axes of said members being perpendicular to the planes of the panels, and elongated hollow bars positioned in the spaces between each pair of adjacent plate-fin panels, each bar extending from one of the pair of support members adjacent one longitudinal edge of a panel to the other support member adjacent the opposite longitudinal edge of the panel and having opposed rows of spray orifices facing the exterior surfaces of the adjacent side walls of corresponding pairs of said panels, and means for delivering liquid under pressure to said hollow bars for jetting from said spray orifices against the adjacent panel surfaces.

33. A heat exchanger according to claim 32 wherein said means for moving the dislodging means comprises means for translating said elongated support members in unison parallel to the longitudinal edges of said panels.

34. A heat exchanger according to claim 33 wherein said means for translating said elongated support bars in unison parallel to the longitudinal edges of said panels comprises:
- endless flexible carrier means extending parallel and adjacent to the opposite longitudinal edges of said plate-fin panels;
- means for attaching each end of each of the pair of support bars to a corresponding one of the longitudinal endless flexible carrier means for longitudinal movement thereby; and
- means for driving all of said longitudinal endless flexible carrier means in synchronism.

* * * * *

UNITED STATES PATENT AND TRADEMARK OFFICE
CERTIFICATE OF CORRECTION

PATENT NO. : 4,497,363
DATED : 5 February 1985
INVENTOR(S) : William E. Heronemus It is certified that error appears in the above—identified patent and that said Letters Patent is hereby corrected as shown below:

Column 15, line 3 : change "14" to --20--.

Column 15, line 6 : change "14" to --20--.

Signed and Sealed this

Twenty-seventh Day of August 1985

[SEAL]

Attest:

DONALD J. QUIGG

Attesting Officer     Acting Commissioner of Patents and Trademarks